E. VAN NOORDEN.
COMBINED TROUGH AND GLASS SUPPORT FOR GLAZED STRUCTURES.
APPLICATION FILED FEB. 9, 1912.
1,049,009. Patented Dec. 31, 1912.
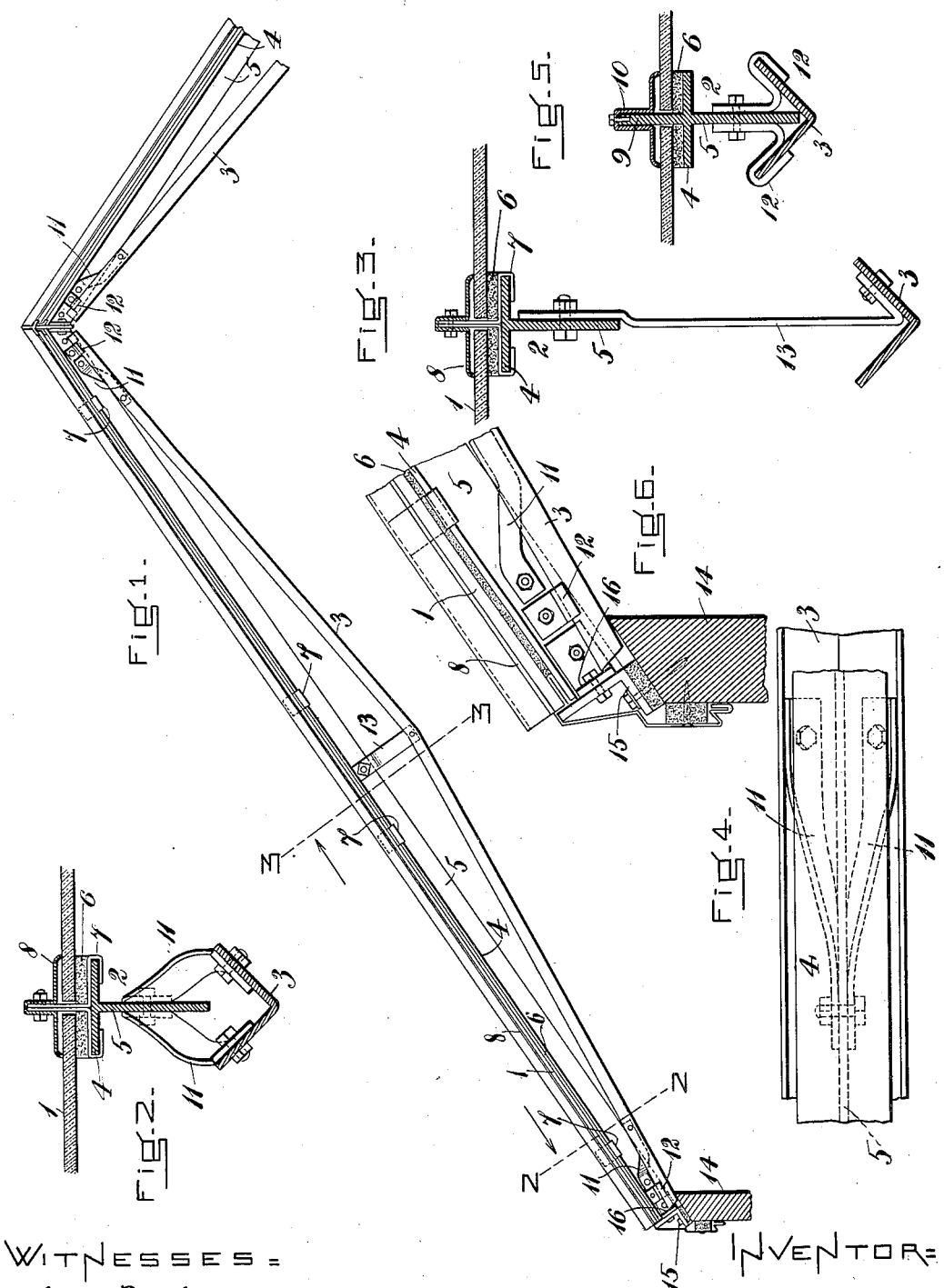

UNITED STATES PATENT OFFICE.

EZEKIEL VAN NOORDEN, OF BOSTON, MASSACHUSETTS.

COMBINED TROUGH AND GLASS-SUPPORT FOR GLAZED STRUCTURES.

1,049,009.

Specification of Letters Patent. Patented Dec. 31, 1912.

Application filed February 9, 1912. Serial No. 676,514.

*To all whom it may concern:*

Be it known that I, EZEKIEL VAN NOORDEN, of Boston, in the county of Suffolk and State of Massachusetts, a citizen of the United States, have invented a new and useful Improvement in Combined Troughs and Glass-Supports for Glazed Structures, of which the following is a full, clear, and exact description, reference being had to the accompanying drawings, forming a part of this specification, in explaining its nature.

My invention relates to that type of support for glazed structures which consists of bars upon which the panes of glass rest and which have combined with them troughs for receiving and carrying off the water of condensation. The supporting bars and troughs usually extend from the curb of the building or structure to the apex. In many cases this distance is of considerable extent and the weight of the glazed structure, especially if other weight be added thereto, is apt to cause bending or distortion of the supporting bars.

It is accordingly the object of my invention to provide a construction in which the troughs are so made and so combined with the supporting bars as to form a series of trusses which give ample support to the glazed structure even though the supporting bars or trusses be of considerable length.

My invention can best be seen and understood by reference to the drawings in which—

Figure 1 shows an embodiment thereof in side elevation. Fig. 2 is a section taken on line 2—2 of Fig. 1. Fig. 3 is a section taken on the line 3—3 of Fig. 1, and Fig. 4 is a plan of a portion of the apparatus to which reference will later be made. Fig. 5 is a cross section of a portion of the device showing in part a slightly modified construction. Fig. 6 is a section of a portion of the device to which reference will hereinafter be made.

Referring to the drawings:—1 represents the panes of glass, 2 the bars which support the panes of glass, and 3 the troughs which extend along beneath and combine with the glass-supporting bars, as will later be explained. I prefer to employ that type of glass-supporting bar which is substantially T-shaped in cross section and a trough consisting of a bar substantially V-shaped in cross section as these are bars of a standard type or form.

The glass-supporting bars 2 each consists of a head 4 and a shank 5. The panes of glass do not rest directly upon the head of the bar, there generally being interposed between the head and edges of the panes of glass some soft material such as felt 6. The panes of glass are held in place by means of clips 7 which engage the head 4 of the supporting bar along the sides thereof and are bent inwardly to extend between it and the felt and thence upwardly through the felt and between the panes of glass where the clip has secured to it a cap 8 which overlaps and bears against the edges of the panes holding them in place and also closing and concealing the joint between them. This construction of course may be varied, as for example in Fig. 5 there is shown another expedient for holding the panes of glass in place and covering the joint between them. In this figure the supporting bar is provided with a rib 9 which extends upwardly from the head thereof to pass through the felt and between the panes of glass in a manner of a clip as above described, and has secured to it a cap 10 which overlaps the edges of the panes covering and concealing the joint between them in the same manner as did the clip 7 first described.

The troughs are each bent into the form of a truss having a length substantially equal to that of the glass-supporting bar 2 beneath which the trough extends. Each set of glass-supporting bars and troughs are combined in the following manner: The ends of the trough are secured to the ends of the supporting bar by means of straps 11. These straps are bolted or otherwise secured to the shank of the supporting bar on opposite sides thereof and thence extend inwardly to become bolted or otherwise secured to the interior sides of the trough, the straps being turned or twisted substantially as shown in Figs. 2 and 4. I prefer also that at its opposite ends the shank of each bar shall extend into and rest upon the bottom of the trough and the parts be connected by clips 12 secured to the shank of the bar and bent to embrace the edges of the trough substantially as shown in Fig. 5.

Each truss-forming trough is so bent that the angle formed therein will preferably come about the longitudinal center thereof and that of the glass-supporting bar to which the trough is secured. Resting upon the bottom of the trough at the point of its angle and extending upwardly to connect with the shank of the supporting bar is a post 13 through which means the trough, acting as a truss, supports and reinforces the bar on which the panes of glass rest.

The glass-supporting bars and troughs combined in accordance with my invention, may be applied to the building or structure in the customary manner. Usually the bars and troughs rest upon the curb 14 of the building and extend upward and meet at the apex substantially as shown in Fig. 1. They may be held in place as against endwise and lateral displacement in any suitable manner. The customary method is a brace 15 secured to the curb of the building below the end of each bar and combined trough and against which the end of the bar is adapted to bear, the bar being then held in place in an upright position and its trough properly positioned beneath it by means of angle pieces 16 which are secured to the brace 15 and also the shank of the glass-supporting bar substantially as shown in Fig. 6.

Having thus fully described my invention, I claim and desire to secure by Letters Patent of the United States:—

1. In a combined trough and glass support for glazed structures, the combination with a supporting bar on which the panes of glass rest, of a trough located below said bar, said trough being constructed and arranged to form an angular truss support for said bar, means for fixedly securing the ends of said trough, and brace-forming means interposed between said trough and said bar.

2. In a combined trough and glass support for glazed structures, the combination with a supporting bar on which the panes of glass rest, of a trough located below said bar, said trough being longitudinally bent into the form of a truss, means connecting the ends of said trough to said bar, and a brace interposed between said trough and said bar.

EZEKIEL VAN NOORDEN.

Witnesses:
JOHN E. R. HAYES,
JAMES J. KENNEALLY.